United States Patent
Kamio

(10) Patent No.: US 11,162,580 B2
(45) Date of Patent: Nov. 2, 2021

(54) SHIFT RANGE CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

(*) Notice: Subject to any disclaimer, the term of this patent is extended or adjusted under 35 U.S.C. 154(b) by 63 days.

(21) Appl. No.: 16/811,170

(22) Filed: Mar. 6, 2020

(65) Prior Publication Data

US 2020/0208741 A1 Jul. 2, 2020

Related U.S. Application Data

(63) Continuation of application No. PCT/JP2018/033241, filed on Sep. 7, 2018.

(30) Foreign Application Priority Data

Sep. 11, 2017 (JP) .............................. JP2017-174098

(51) Int. Cl.
*F16H 61/32* (2006.01)
*F16H 59/08* (2006.01)
(Continued)

(52) U.S. Cl.
CPC ............. *F16H 61/32* (2013.01); *F16H 59/08* (2013.01); *F16H 61/0204* (2013.01); *H02P 6/16* (2013.01); *F16H 2061/326* (2013.01)

(58) Field of Classification Search
None
See application file for complete search history.

(56) References Cited

U.S. PATENT DOCUMENTS 6,196,078 B1 * 3/2001 DeJonge ............... B60K 20/08
74/473.12
7,243,567 B2 * 7/2007 Osamura ............... F16H 61/32
477/122
(Continued)

FOREIGN PATENT DOCUMENTS

| JP | 2019-019957 | 2/2019 |
|---|---|---|
| WO | 2019/049809 | 3/2019 |
| WO | 2019/049993 | 3/2019 |

OTHER PUBLICATIONS

U.S. Appl. No. 16/801,598, inventor: Yamada, entitled "Shift Range Control Device", filed Feb. 26, 2020, (37 pages).
(Continued)

*Primary Examiner* — Dirk Wright
(74) *Attorney, Agent, or Firm* — Nixon & Vanderhye P.C.

(57) ABSTRACT

An angle calculation unit calculates a motor angle based on a motor rotation angle signal acquired from a motor rotation angle sensor that detects a rotational position of a motor. An acceleration variation calculation unit calculates an acceleration variation parameter related to an amount of variation in motor acceleration, based on the motor angle. An idle running determination unit determines the end of an idle running state in which the motor is rotating within the range of play, based on the acceleration variation parameter. A target setting unit sets a target motor angle by adopting an angle correction value that is a value corresponding to the motor angle at the end of the idle running state. A drive control unit controls the drive of the motor such that the motor angle becomes the target motor angle.

6 Claims, 7 Drawing Sheets

(51) Int. Cl.
    *F16H 61/02*     (2006.01)
    *H02P 6/16*     (2016.01)

(56) References Cited

U.S. PATENT DOCUMENTS

| | | | |
|---|---|---|---|
| 8,560,193 B2 * | 10/2013 | Krishnaswami | F16H 61/32 701/62 |
| 2003/0222617 A1 | 12/2003 | Nakai et al. | |
| 2006/0033464 A1 | 2/2006 | Nakai et al. | |
| 2006/0197489 A1 | 9/2006 | Nakai et al. | |
| 2007/0182353 A1 | 8/2007 | Kamio et al. | |
| 2009/0193923 A1 | 8/2009 | Nakai et al. | |
| 2011/0068730 A1 | 3/2011 | Nakai et al. | |

OTHER PUBLICATIONS

U.S. Appl. No. 16/807,568, inventor: Kamio, entitled "Shift Range Control Device", filed Mar. 3, 2020, (23 pages).

* cited by examiner

SHIFT RANGE CONTROL DEVICE

CROSS REFERENCE TO RELATED APPLICATIONS

The present application is a continuation application of International Patent Application No. PCT/JP2018/033241 filed on Sep. 7, 2018, which designated the U.S. and claims the benefit of priority from Japanese Patent Application No. 2017-174098 filed on Sep. 11, 2017. The entire disclosures of all of the above applications are incorporated herein by reference.

TECHNICAL FIELD

The present disclosure relates to a shift range control device.

BACKGROUND

A shift range switching device may switch a shift range by controlling a motor in response to a shift range switching request from a driver. For example, abutting control is executed at the time of activation to learn the amount of play.

SUMMARY

The present disclosure describes a shift range control device for switching a shift range.

BRIEF DESCRIPTION OF DRAWINGS

The above object and other objects, features, and advantages of the present disclosure will become more apparent from the following detailed description with reference to the accompanying drawings. In the drawing.

DETAILED DESCRIPTION

In the abutting control, the motor is rotated to a limited position of a movable range with a relatively large torque. Thus, stress is applied to a member such as a detent roller or a detent plate. It is an objective of the present disclosure to provide a shift range control device for executing highly accurate positioning control without executing abutting control.

The shift range control device of the present disclosure switches a shift range by controlling drive of a motor in a shift range switching system with play existing between a motor shaft as a rotating shaft of the motor and an output shaft to which the rotation of the motor is transmitted. The shift range control device includes an angle calculation unit, an acceleration variation calculation unit, an idle running determination unit, a target setting unit, and a drive control unit.

The angle calculation unit calculates a motor angle based on a motor rotation angle signal acquired from a motor rotation angle sensor that detects a rotational position of a motor. The acceleration variation calculation unit calculates an acceleration variation parameter related to the amount of variation in motor acceleration, based on the motor angle. The idle running determination unit determines the end of an idle running state in which the motor is rotating within the range of play, based on the acceleration variation parameter. The target setting unit sets a target motor angle value by adopting an angle correction value as a value corresponding to the motor angle at the end of the idle running state. The drive control unit controls the drive of the motor such that the motor angle becomes the target motor angle value. Therefore, it is possible to execute highly accurate positioning control without executing abutting control.

First Embodiment

Figure 1:
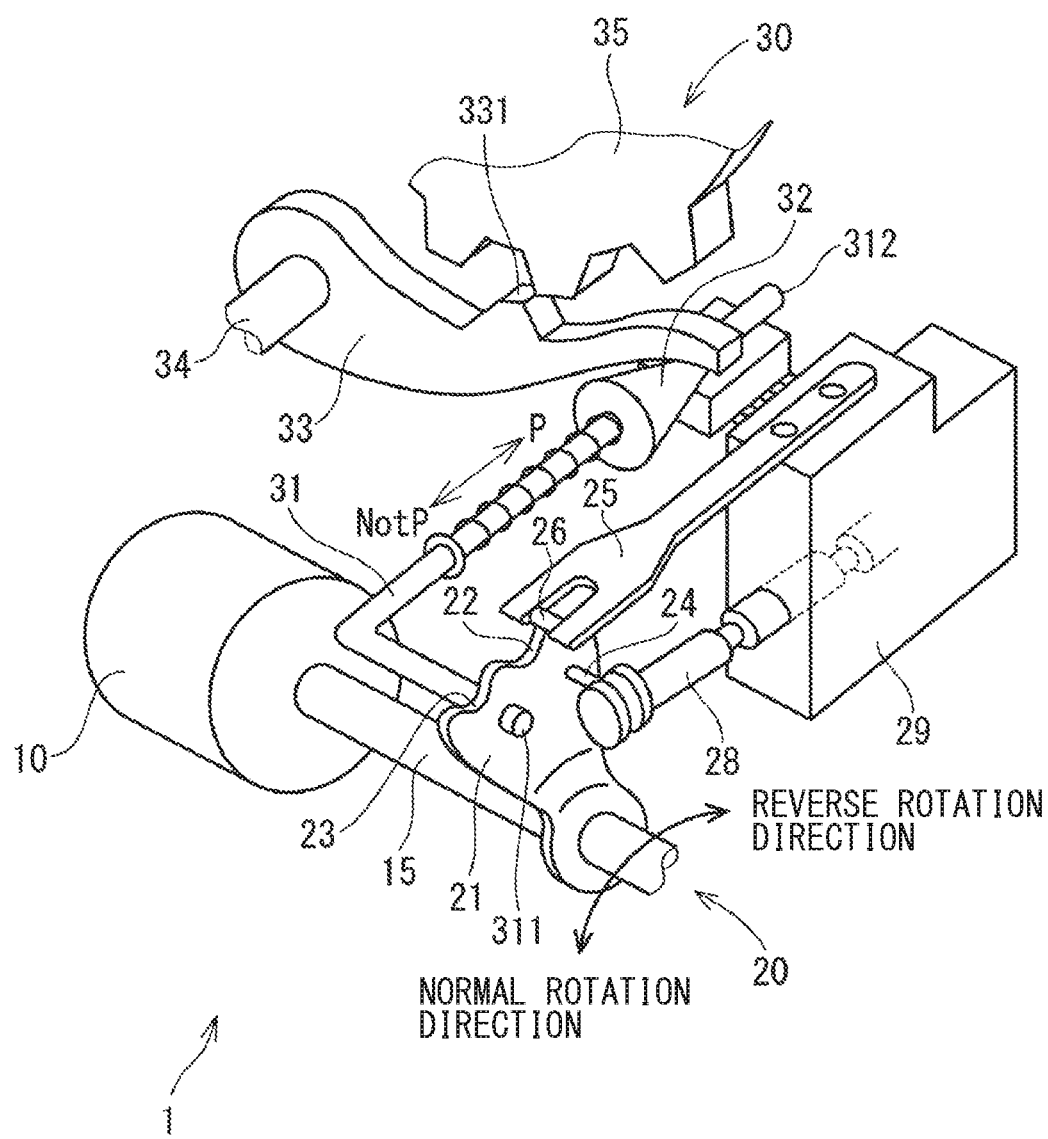
FIG. 1 is a perspective view showing a shift-by-wire system according to a first embodiment.
Figure 2:
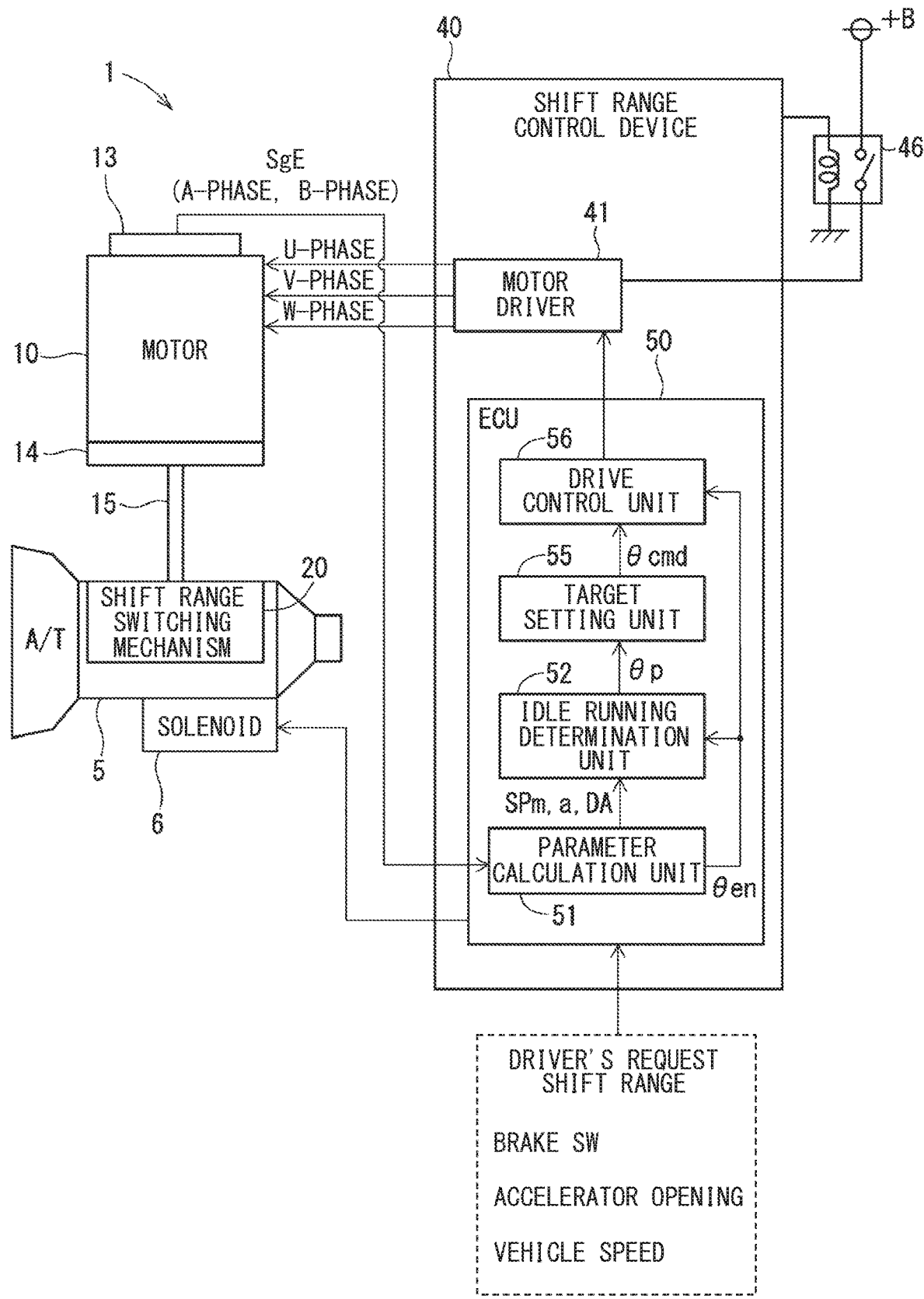
FIG. 2 is a schematic configuration diagram showing the shift-by-wire system according to the first embodiment.

The following describes a shift range control device with reference to the drawings. Identical components have the same reference numerals and the descriptions of the identical components are omitted, regardless of whether they are shown in different embodiments. A shift range control device according to first embodiment is shown in FIGS. 1 to 6. As shown in FIGS. 1 and 2, a shift-by-wire system 1 as a shift range switching system includes a motor 10, a shift range switching mechanism 20, a parking lock mechanism 30, a shift range control device 40, or the like. The motor 10 rotates by being supplied with electric power from a battery mounted in a vehicle (not shown). The motor 10 functions as a drive source for the shift range switching mechanism 20. The motor 10 of the present embodiment is a switched reluctance motor. The switched reluctance motor may be referred to as an "SR motor" as needed. The motor 10 may not only be limited to the SR motor, but also may be a direct-current (DC) brushless motor or the like.

As shown in FIG. 2, an encoder 13 as a motor rotation angle sensor detects a rotational position of a rotor (not shown) of the motor 10. The encoder 13 is, for example, a magnetic rotary encoder and is made up of a magnet that rotates integrally with the rotor, a magnetic detection Hall integrated circuit (IC), or the like. The encoder 13 outputs pulse signals of an A-phase and a B-phase at predetermined angles in synchronization with the rotation of the rotor. The signal from the encoder 13 may be referred to as a motor rotation angle signal SgE. In the present embodiment, the encoder 13 is configured by a single system that outputs one signal for each of the A-phase and the B-phase. In the present embodiment, the encoder 13 has higher angle detection accuracy than the output shaft sensor 16.

A speed reducer 14 is provided between a motor shaft 105 (see FIG. 3) of the motor 10 and an output shaft 15. The speed reducer 14 decelerates the rotation of the motor 10, and outputs the rotation to the output shaft 15. The rotation of the motor 10 is transmitted to the shift range switching mechanism 20. In the present embodiment, an output shaft sensor that detects the rotational position of the output shaft 15 may be omitted.

As shown in FIG. 1, the shift range switching mechanism 20 includes a detent plate 21, a detent spring 25, or the like and transmits a rotational driving force, output from the speed reducer 14, to a manual valve 28 and the parking lock mechanism 30. The detent plate 21 is fixed to the output shaft 15 and driven by the motor 10. In the present embodiment, a direction in which the detent plate 21 is separated from the base of the detent spring 25 is defined as a normal rotation direction, and a direction in which the detent plate 21 approaches the base is defined as a reverse rotation direction.

The detent plate 21 is provided with a pin 24 that protrudes in parallel with the output shaft 15. The pin 24 is connected to the manual valve 28. The detent plate 21 is driven by the motor 10, and the manual valve 28 reciprocates in an axial direction. That is, the shift range switching mechanism 20 converts the rotational motion of the motor 10 into linear motion and transmits the linear motion to the manual valve 28. The manual valve 28 is provided on a valve body 29. A hydraulic pressure supply path to a hydraulic clutch (not shown) is switched by the reciprocation of the manual valve 28 in the axial direction, and the shift range is changed by the switching of the engagement state of the hydraulic clutch. Two recesses 22, 23 are provided in the detent plate 21 on the detent spring 25 side. In the present embodiment, the side closer to the base of the detent spring 25 is the recess 22, and the side farther therefrom is the recess 23. In the present embodiment, the recess 22 corresponds to a not-P range except for a P range, and the recess 23 corresponds to the P (parking) range.

The detent spring 25 is an elastically deformable plate-like member, and a detent roller 26 is provided at the tip of the detent spring 25. The detent spring 25 biases the detent roller 26 toward the revolving center side of the detent plate 21. When a rotational force equal to or greater than a predetermined force is applied to the detent plate 21, the detent spring 25 is elastically deformed, and the detent roller 26 moves between recesses 22, 23. By the detent roller 26 being fitted into either the recesses 22 or 23, a swing of the detent plate 21 is restricted, an axial position of the manual valve 28 and the state of the parking lock mechanism 30 are determined, and the shift range of an automatic transmission 5 is fixed. The detent roller 26 fits into the recess 22 when the shift range is the not-P range, and fits into the recess 23 when the shift range is the P range.

The parking lock mechanism 30 includes a parking rod 31, a cone 32, a parking lock pole 33, a shaft portion 34, and a parking gear 35. The parking rod 31 is formed in a substantially L shape, and one end 311 is fixed to the detent plate 21. A cone 32 is provided on the other end 312 side of the parking rod 31. The cone 32 is formed so as to decrease in diameter toward the other end 312. When the detent plate 21 swings in the reverse rotation direction, the cone 32 moves in a P direction.

The parking lock pole 33 is in contact with the conical surface of the cone 32, and on the parking gear 35 of the parking lock pole 33 provided so as to be able to swing around the shaft portion 34, a protrusion 331 that can mesh with the parking gear 35 is provided. When the detent plate 21 rotates in the reverse rotation direction and the cone 32 moves in a P direction, the parking lock pole 33 is pushed up, and the protrusion 331 and the parking gear 35 mesh with each other. On the other hand, when the detent plate 21 rotates in the normal rotation direction and the cone 32 moves in a not-P direction, the engagement between the protrusion 331 and the parking gear 35 is released.

The parking gear 35 is provided on an axle (not shown) and is provided so as to be able to mesh with the protrusion 331 of the parking lock pole 33. When the parking gear 35 and the protrusion 331 mesh with each other, the rotation of the axle is restricted. When the shift range is the not-P range, the parking gear 35 is not locked by the parking lock pole 33, and the rotation of the axle is not hindered by the parking lock mechanism 30. When the shift range is the P range, the parking gear 35 is locked by the parking lock pole 33, and the rotation of the axle is restricted.

As shown in FIG. 2, the shift range control device 40 includes a motor driver 41, the ECU 50, or the like. The motor driver 41 has a switching element (not shown), and switches energization to each phase (U-phase, V-phase, W-phase) of the motor 10 by turning on and off the switching element based on a command from the ECU 50. Thereby, the drive of the motor 10 is controlled. A motor relay 46 is provided between the motor driver 41 and the battery. The motor relay 46 is turned on when the vehicle's start switch such as an ignition switch is on, and electric power is supplied to the motor 10 side. Further, the motor relay 46 is turned off when the start switch is off, and the supply of the electric power to the motor 10 side is cut off.

The ECU 50 includes a microcomputer or the like, and includes a central processing unit (CPU), a read-only memory (ROM), a random access memory (RAM), an input/output (I/O) (not shown), a bus line that connects these constituents, or the like. Each processing in the ECU 50 may be software processing executed by the CPU executing a program stored in advance in a tangible memory device (i.e., a readable non-transitory tangible recording medium) such as a ROM, or may be hardware processing executed by a dedicated electronic circuit.

The ECU 50 controls the switching of the shift range by controlling the drive of the motor 10 based on the driver's request shift range, a signal from a brake switch, a vehicle speed, or the like. Further, the ECU 50 controls the drive of a transmission hydraulic control solenoid 6 based on the vehicle speed, an accelerator opening, the driver's request shift range, or the like. A gear stage is controlled by controlling the transmission hydraulic control solenoid 6. The number of transmission hydraulic control solenoids 6 is provided in accordance with the number of gear stages. In the present embodiment, one ECU 50 controls the drive of the motor 10 and the drive of the solenoid 6, but a motor ECU for controlling the motor 10 and an automatic transmission (AT)-ECU for controlling the solenoid may be separated. The following mainly describes the drive control for the motor 10.

As shown in FIG. 2, the ECU 50 includes a parameter calculation unit 51, an idle running determination unit 52, a target setting unit 55, a drive control unit 56, or the like. The parameter calculation unit 51 calculates an encoder count value θen as a count value of the encoder 13 based on the motor rotation angle signal SgE output from the encoder 13. The encoder count value θen is a value corresponding to an actual mechanical angle and an electrical angle of the motor 10. In the present embodiment, the encoder count value θen corresponds to the "motor angle." The encoder count value θen is calculated for each edge-triggered interrupt of the motor rotation angle signal SgE.

The parameter calculation unit 51 calculates a motor speed SPm [deg/s] for each edge-triggered interrupt of the motor rotation angle signal SgE (see Expression (1)). A constant ke in the expression is a motor rotation angle corresponding to one count of the encoder count value θen, and a time is t. A subscript $_{(n)}$ means a value in the current calculation, and a subscript $_{(n-1)}$ means a value in the previous calculation, but the subscript in the current calculation is omitted as appropriate. That is, when t is an encoder interrupt time, $t_{(n)}$ is the current interrupt time, and $t_{(n-1)}$ is the previous interrupt time. The motor speed SPm may also be regarded as the amount of change in the motor angle per unit time.

$$SPm = ke/(t_{(n)} - t_{(n-1)}) \quad (1)$$

The parameter calculation unit 51 calculates a motor acceleration "a" [deg/s$^2$] for each edge-triggered interrupt of the motor rotation angle signal SgE (see Expression (2)). Note that the motor speed SPm and the motor acceleration "a" may be calculated in any manner, such as differentiation of the motor angle. Further, a calculation cycle or the like may be set as appropriate.

$$a = (SPm_{(n)} - SPm_{(n-1)})/(t_{(n)} - t_{(n-1)}) \quad (2)$$

The parameter calculation unit 51 calculates an acceleration variation parameter related to the amount of variation in the motor acceleration "a." In the present embodiment, a value corresponding to a length of an acceleration variation waveform line that indicates a temporal change in the motor acceleration "a" is the acceleration variation parameter. Hereinafter, the value corresponding to the length of the acceleration variation waveform line is simply referred to as a "length DA of the acceleration variation waveform line." In the present embodiment, the length DA of the acceleration variation waveform line is an integrated value of an acceleration change amount ai that is an absolute value of the amount of change in the motor acceleration "a" per unit time. The acceleration change amount ai is represented by Expression (3-1), and the length DA of the acceleration variation waveform line is represented by Expression (3-2).

$$ai = |a_{(n)} - a_{(n-1)}|/(t_{(n)} - t_{(n-1)}) \quad (3\text{-}1)$$

$$DA = DA_{(n-1)} + ai \quad (3\text{-}2)$$

The idle running determination unit 52 determines whether the state is an idle running state in which the motor 10 is rotating within the range of play between the motor shaft 105 and the output shaft 15, based on the encoder count value θen, the motor speed SPm, the motor acceleration "a," and the length DA of the acceleration variation waveform line. In particular, the idle running determination unit 52 detects timing at which the idle running state ends by using the idle running determination.

The target setting unit 55 sets a target shift range based on the driver's request shift range based on a shift switch or the like, a vehicle speed, a signal from a brake switch, or the like. Further, the target setting unit 55 sets a target count value θcmd corresponding to the target shift range and being a target motor angle value. The target count value θcmd is corrected with an angle correction value θp corresponding to the encoder count value θen at the end of the idle running. The drive control unit 56 controls the drive of the motor 10 by feedback control or the like so that the motor 10 stops at a rotational position where the encoder count value θen becomes a target count value θcmd.

Figure 3:
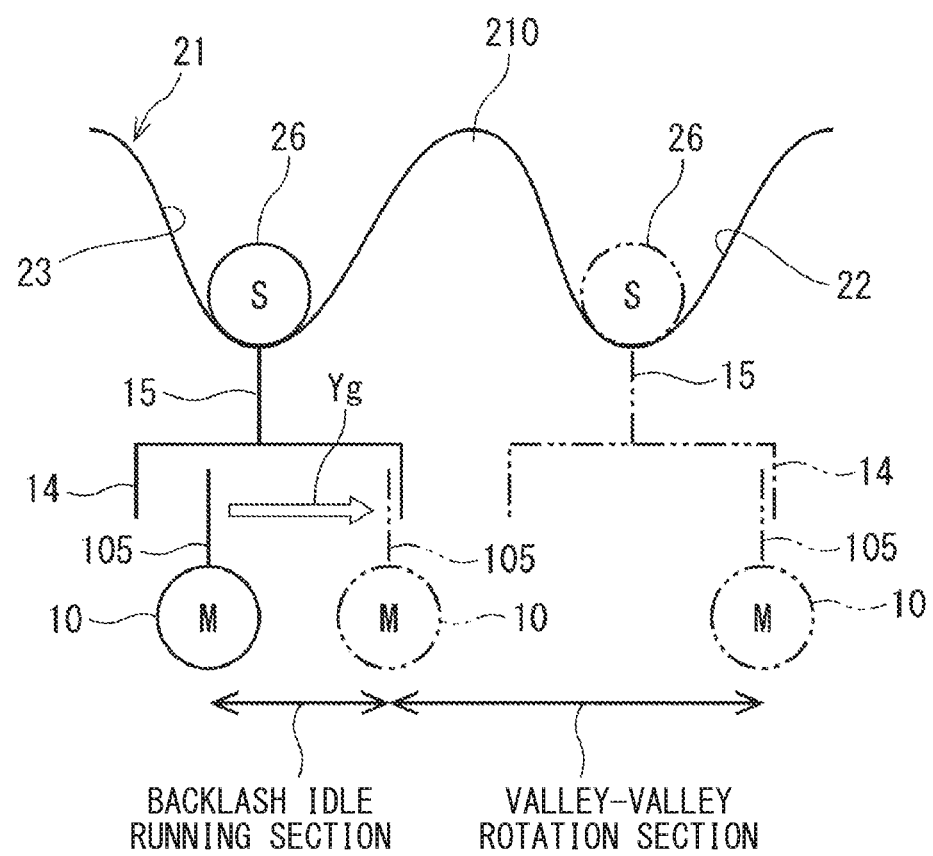
FIG. 3 is a schematic diagram for illustrating play between a motor and an output shaft according to the first embodiment.
Figure 4:
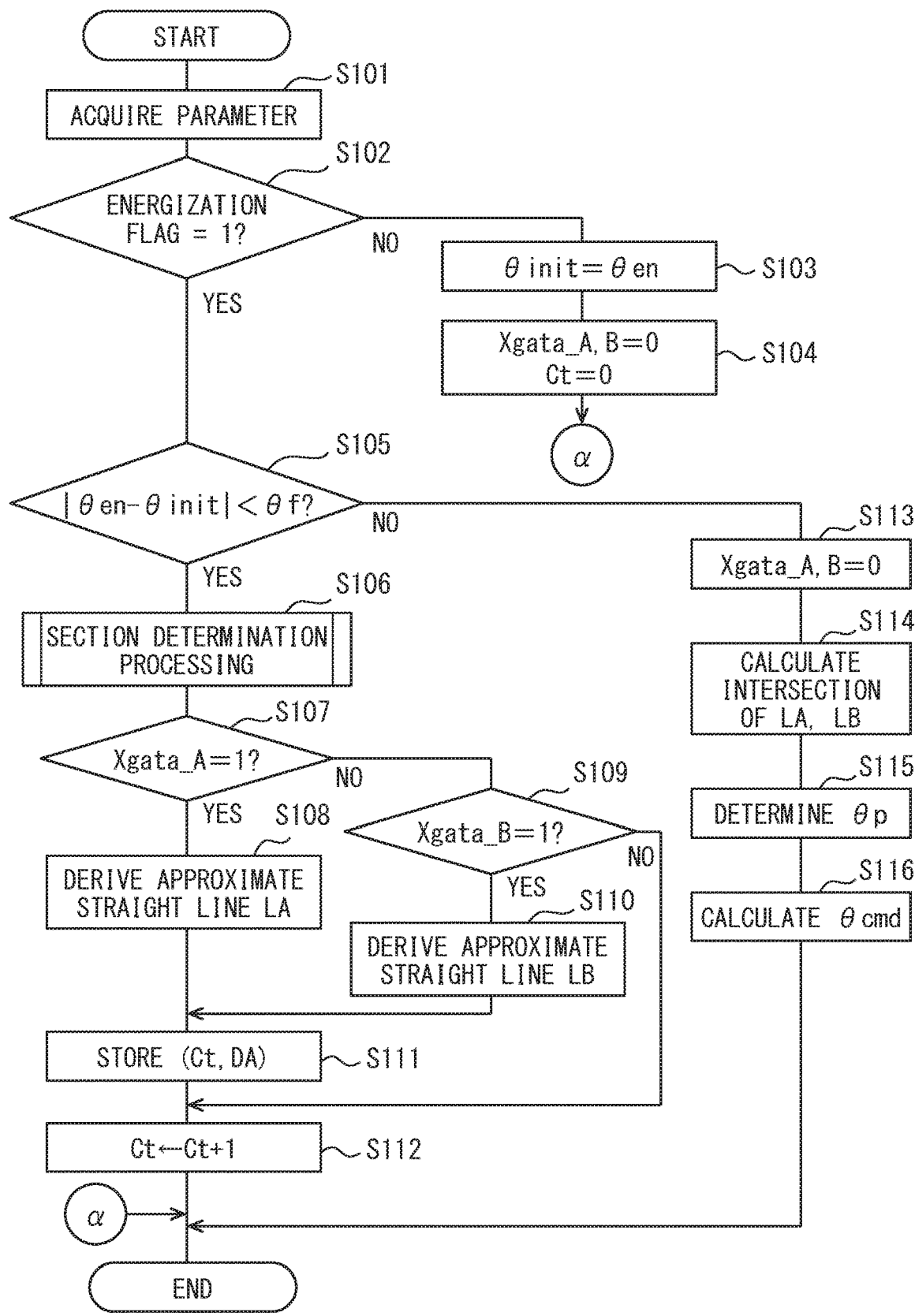
FIG. 4 is a flowchart for illustrating target setting processing according to the first embodiment.

FIG. 3 shows the relationship among the motor shaft 105 that is a rotation shaft of the motor 10, the output shaft 15, and the detent plate 21. FIG. 3 schematically shows a state in which the motor 10 rotates from a state indicated by solid line to a state indicated by two-dot chain line, whereby the detent roller 26 gets over the peak 210 between the recesses 22, 23 of the detent plate 21 and fits into the recesses 22, 23 in accordance with the driver's request shift range. Here, switching from the P range to the not-P range will be described as an example. In FIG. 3, the description will be made assuming that the rotation direction of each of the motor 10 and the output shaft 15 is a right-left direction on the paper. FIG. 3 is a schematic diagram conceptually showing "play," assuming that the output shaft 15 and the speed reducer 14 are integrated, and the motor shaft 105 can move within the range of play of the speed reducer 14. However, it may be configured such that the motor shaft 105 and the speed reducer 14 are integrated, and that "play" exists between the speed reducer 14 and the output shaft 15.

As shown in FIG. 3, the speed reducer 14 is provided between the motor shaft 105 and the output shaft 15, and there is "play" including gear backlash between the motor shaft 105 and the output shaft 15. In the present embodiment, the motor 10 is a DC brushless motor, and when energization of the motor 10 is stopped, due to an influence of a cogging torque or the like, the motor shaft 105 may rotate within the range of play, and the motor shaft 105 and the speed reducer 14 may be separated from each other.

As indicated by arrow Yg, when the motor 10 rotates in a state where the motor shaft 105 and the speed reducer 14 are separated in the rotation direction, until the motor shaft 105 and the speed reducer 14 come into contact with each other, the motor 10 is in an idle running state, and the rotation of the motor 10 is not transmitted to the output shaft 15 side. Hereinafter, a state in which the rotation of the motor 10 is not transmitted to the output shaft 15 within the range of play is referred to as a "backlash idle running state" or an "idle running state," and a section in which the state is the backlash idle running state is an "idle running section." Further, that the backlash idle running state ends is referred to as "backlash ending."

When the backlash idle running ends, the motor 10, the output shaft 15, and the detent plate 21 rotate integrally. As a result, the detent roller 26 gets over the peak 210 between the recesses 22, 23 and moves to the recess 22. A section in which the detent roller 26 moves between the recesses 22, 23 after the end of the backlash idle running state is referred to as a "valley-valley rotation section." Further, a section after the backlash idle running state ends until the detent roller 26 gets over the top of the peak 210 is referred to as an "integral rotation section."

Meanwhile, when the energization is started to switch the shift range from a state where the energization of the motor 10 is off, it may be difficult to specify the position of the motor shaft 105 within the range of "play." In addition, when the motor shaft 105 and the speed reducer 14 are separated from each other in the rotational direction, as compared to the case of rotating the motor 10 from a state where the motor shaft 105 and the speed reducer 14 are in contact, extra rotation of the motor 10 is necessary for the backlash idle running.

In the present embodiment, focusing on that the variation in the motor acceleration "a" is large when the motor 10 and the output shaft 15 are rotating integrally as compared to in the backlash idle running state, the end of backlash idle running is detected based on the length DA of the acceleration variation waveform line, and the target count value θcmd is corrected, to ensure accuracy in position control. The target setting processing of the present embodiment is described based on a flowchart shown in FIG. 4. Hereinafter, "step" in step S101 is omitted and simply referred to as "S." This also applies to the other steps. In the figure, a state where a flag has been set is "1," and a state where the flag has not been set is "0."

In first S101, the idle running determination unit 52 acquires the encoder count value θen calculated by the parameter calculation unit 51, the motor speed SPm, the motor acceleration "a," and the length DA of the acceleration variation waveform line. In S102, the idle running determination unit 52 determines whether or not an energization flag has been set. The energization flag is set when the target shift range is changed, and the energization flag is reset after it is determined that the motor 10 has been stopped. When the energization flag is set, the target count value θcmd is set to the temporary value θt, and the drive of the motor 10 is started. When it is determined that the energization flag has been set (S102: YES), the processing proceeds to S105. When it is determined that the energization flag has not been set (S102: NO), the processing proceeds to S103.

In S103, the idle running determination unit 52 stores the current encoder count value θen as a drive initial value θinit into the RAM (not shown) or the like. In S104, the idle running determination unit 52 resets an idle running flag Xgata_A indicating the idle running section, an integral rotation flag Xgata_B indicating the integral rotation section, and a count value Ct of a time counter. Hereinafter, the idle running flag is referred to as a "flag A," and the integral rotation flag is referred to as a "flag B" as appropriate.

In S105 to which the processing proceeds when it is determined that the energization flag has been set (S102: YES), the idle running determination unit 52 determines whether or not the absolute value of the difference between the encoder count value θen and the drive initial value θinit is smaller than a drive initial determination value θf. S105 is a step of determining that the detent roller 26 is in the same recess as that before the switching of the shift range. The situation in that the detent roller 26 is in the same recess as that before the switching of the shift range may be regarded as being before the detent roller 26 gets over the peak 210 and being the range switching initial state. The drive initial determination value θf is set to a value corresponding to the range before the switching and the shape of the detent plate 21. When it is determined that the absolute value of the difference between the encoder count value θen and the drive initial value θinit is less than the drive initial determination value θf (S105: YES), it is determined that the detent roller 26 is in the same recess as that before the switching of the shift range, and the processing proceeds to S106. When it is determined that the absolute value of the difference between the encoder count value θen and the drive initial value θinit is equal to or greater than the drive initial determination value θf (S105: NO), the processing proceeds to S113.

When it is determined that the absolute value of the difference between the encoder count value θen and the drive initial value θinit is less than the drive initial determination value θf (S105: YES), that is, in S106 to which the processing proceeds when the detent roller 26 is in the same recess as that before the range switching, the idle running determination unit 52 executes section determination processing.

Figure 5:
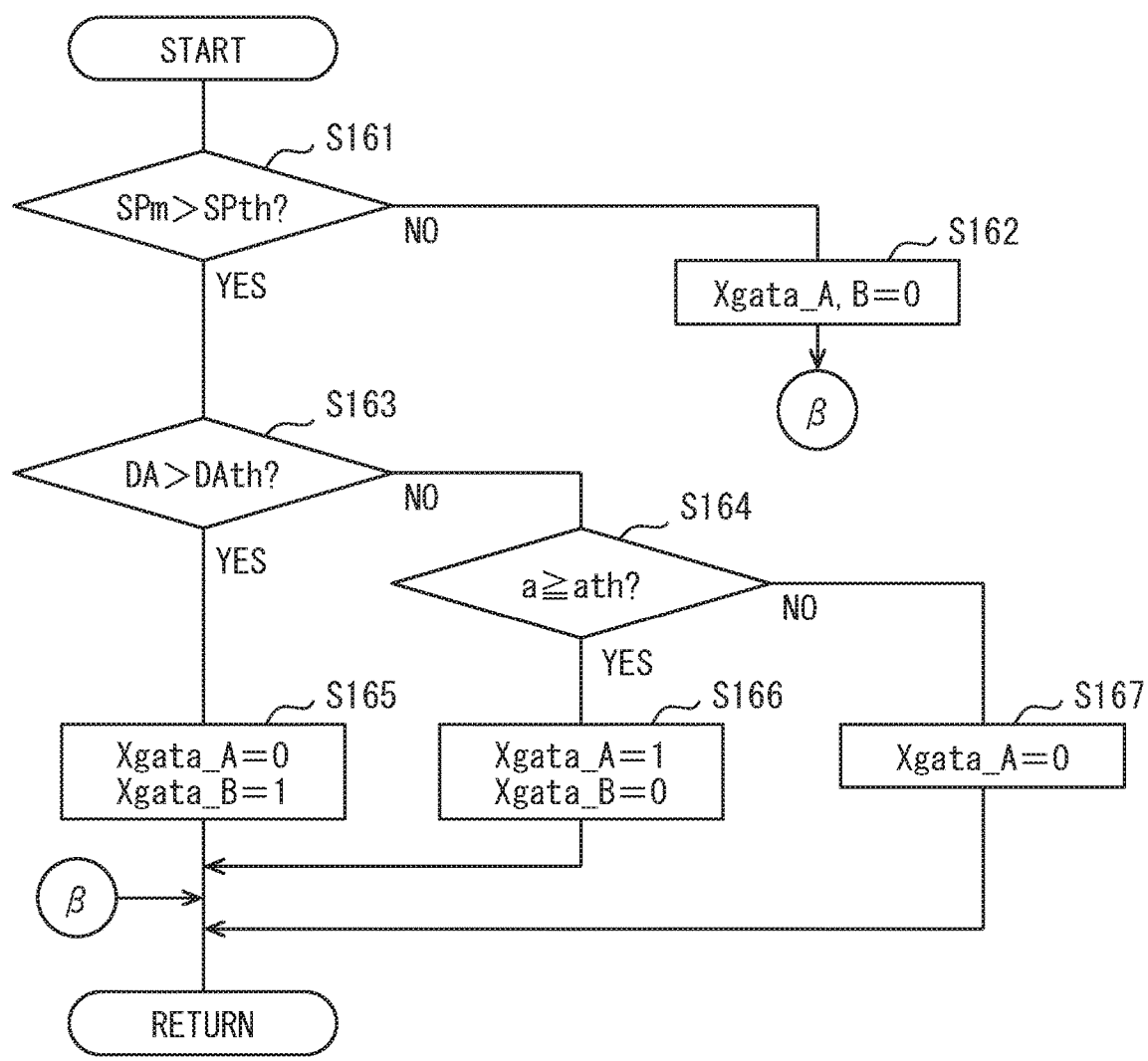
FIG. 5 is a flowchart for illustrating section determination processing according to the first embodiment.

The section determination processing is described based on the flowchart shown in FIG. 5. In S161, the idle running determination unit 52 determines whether or not the motor speed SPm is greater than a speed determination threshold SPth. The speed determination threshold SPth is a value for determining that the motor 10 is rotating, and the speed determination threshold SPth is set to a relatively small value close to 0. When it is determined that the motor speed SPm is equal to or less than the speed determination threshold SPth (S161: NO), the processing proceeds to S162, and the flags A, B are reset. When it is determined that the motor speed SPm is greater than the speed determination threshold SPth (S161: YES), the processing proceeds to S163.

In S163, the idle running determination unit 52 determines whether or not the length DA of the acceleration variation waveform line is greater than a determination threshold DAth. The determination threshold DAth is a value for determining that the motor 10 is in the integrally rotating state and is appropriately set in accordance with the characteristics of the motor 10 or the like. When it is determined that the length DA of the acceleration variation waveform line is greater than the determination threshold DAth (S163: YES), it is determined that the current section is the integral rotation section, and the processing proceeds to S165. When it is determined that the length DA of the acceleration variation waveform line is equal to or less than the determination threshold DAth (S163: NO), the processing proceeds to S164.

In S164, the idle running determination unit 52 determines whether or not the motor acceleration "a" is equal to or greater than an acceleration determination threshold ath. The acceleration determination threshold ath is a value for determining that the motor 10 is in an idle running state and is appropriately set in accordance with the performance of the motor 10 or the like. Further, as the motor acceleration "a," the value itself calculated by Expression (2) may be used, or a calculated value based on the motor acceleration "a" in a predetermined period, an average of a predetermined number of moves, or the like, may be used. When it is determined that the motor acceleration "a" is equal to or greater than the acceleration determination threshold ath (S164: YES), it is determined that the current section is the idle running section, and the processing proceeds to S166. When it is determined that the motor acceleration "a" is smaller than the acceleration determination threshold ath (S164: NO), the processing proceeds to S167.

In S165, the idle running determination unit 52 resets the idle running flag Xgata_A and sets the integral rotation flag Xgata_B. In S166, the idle running determination unit 52 sets the idle running flag Xgata_A and resets the integral rotation flag Xgata_B. In S167, the idle running determination unit 52 resets the idle running flag Xgata_A. After S165 to S167, the processing proceeds to S107 in FIG. 4.

In S107 to which the processing proceeds after the section determination processing, the idle running determination unit 52 determines whether or not the idle running flag Xgata_A has been set. When it is determined that the idle running flag Xgata_A has not been set (S107: NO), the processing proceeds to S109. When it is determined that the idle running flag Xgata_A has been set (S107: YES), the processing proceeds to S108.

In S108, the idle running determination unit 52 derives an approximate straight line of the length DA of the acceleration variation waveform line in the idle running section, with the count value Ct of the time counter as the x coordinate and the length DA of the acceleration variation waveform line as the y coordinate. The approximate straight line of the length DA of the acceleration variation waveform line in the idle running section is represented by Expression (4).

$$y=px+q \qquad (4)$$

In S109, the idle running determination unit 52 determines whether or not the integral rotation flag Xgata_B has been set. When it is determined that the integral rotation flag Xgata_B has not been set (S109: NO), the processing proceeds to S112. When it is determined that the integral rotation flag Xgata_B has been set (S109: YES), the processing proceeds to S110.

In S110, the idle running determination unit 52 derives an approximate straight line of the length DA of the acceleration variation waveform line in the integral rotation section, with the count value Ct of the time counter as the x coordinate and the length DA of the acceleration variation waveform line as the y coordinate. The approximate straight line of the length DA of the acceleration variation waveform line in the integral rotation section is represented by Expression (5).

$$y=rx+s \qquad (5)$$

The approximate straight line of the length DA of the acceleration variation waveform line in the idle running section is referred to as an "approximate straight line LA," and the approximate straight line of the length DA of the acceleration variation waveform line in the integral rotation section is referred to as an "approximate straight line LB." In the present embodiment, the approximate straight line LA corresponds to the "first approximate line," and the approximate straight line LB corresponds to the "second approximate line."

S111 is subsequent to S108 or S110. In S111, the idle running determination unit 52 associates the count value Ct of the time counter at present and the length DA of the acceleration variation waveform line with the states of the flags A, B, and stores those into a memory such as the RAM (not shown). In S112, the count value Ct of the time counter is incremented.

In S113 to which the processing proceeds when it is determined that the absolute value of the difference between the encoder count value θen and the drive initial value θinit is equal to or greater than the drive initial determination value θf (S105: NO), the idle running determination unit 52 resets both the flags A, B. In S114, the idle running determination unit 52 calculates the intersection of the approximate straight lines LA, LB. In the present embodiment, it is determined that the idle running state ends at the timing when the length DA of the acceleration variation waveform line becomes an inflection point. The inflection point of the length DA of the acceleration variation waveform line is the intersection of the approximate straight lines LA, LB. Assuming that the X coordinate of the intersection of the approximate straight lines LA, LB is "backlash ending point XX," the backlash ending point XX is represented by Expression (6). When XX is negative, "XX=0" is set.

$$XX=(s-q)/(p-r) \qquad (6)$$

In S115, the idle running determination unit 52 sets the encoder count value θen, stored in association with the count value Ct closest to the backlash ending point XX, as the angle correction value θp. With the count value Ct being a discrete value, the count value Ct closest to the backlash ending point XX calculated in (6) is regarded as "the end of idle running," and the angle correction value θp is set based on the encoder count value θen at the count value Ct.

In S116, the target setting unit 55 calculates the target count value θcmd by using the angle correction value θp (see Expression (7)). θdet in the expression is a valley-valley angle design value, and is a design value set in accordance with the angle of the valley-valley rotation section corresponding to the shift range before switching and the target shift range.

$$\theta cmd=\theta init+\theta p+\theta det \qquad (7)$$

The following describes the derivation of the approximate straight lines LA, LB. In the present embodiment, in S111, the count value Ct of the time counter and the length DA of the acceleration variation waveform line are stored in association with each other. In the present embodiment, linear approximation is executed with, for example, the least square method or the like, using a plurality of (Ct, DA) associated with the idle running flag Xgata_A, to derive the approximate straight line LA. Linear approximation is executed with, for example, the least square method or the like, using a plurality of (Ct, DA) associated with the integral rotation flag Xgata_B, to derive the approximate straight line LB. The approximate straight lines LA, LB may be derived by a method other than the least square method. Moreover, the derivation is not limited to the linear approximation, but approximate lines such as quadratic or higher functions may be derived, and the end of the idle running may be determined using the approximate lines.

Figure 6:
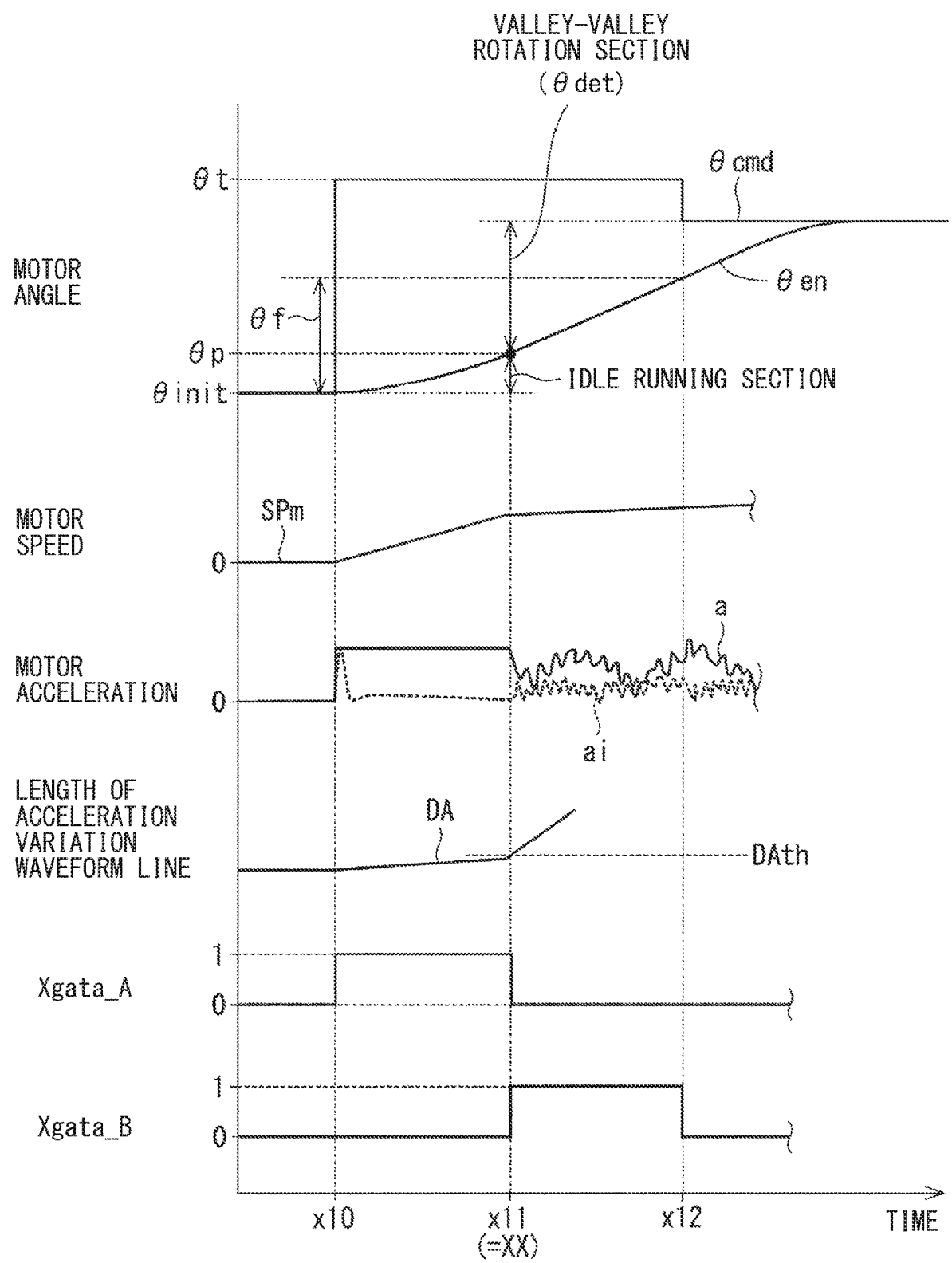
FIG. 6 is a time chart for illustrating motor control processing according to the first embodiment.

The following describes the motor drive control of the present embodiment based on a time chart of FIG. 6. FIG. 6 shows that the common time axis is set as the horizontal axis, and further shows, from the top, the motor angle, the motor speed, the motor acceleration, the length of the acceleration variation waveform line, the idle running flag Xgata_A, and the integral rotation flag Xgata_B. Regarding the motor acceleration, the motor acceleration "a" is indicated by solid line, and the acceleration change amount ai is indicated by broken line. In FIG. 6, a time scale or the like are changed appropriately. Herein, a description is made assuming that the motor 10 rotates in a positive direction.

When the target shift range is changed at time x10, the energization flag is set, the target count value θcmd is set, and the drive of the motor 10 is started. The target count value θcmd set herein is a temporary value θt. Since the target count value θcmd is corrected before the detent roller 26 gets over the peak 210, a temporary value θt may be set to any value with which the detent roller 26 can get over the peak 210. When the drive of the motor 10 is started, the encoder count value θen and the motor speed SPm increase.

When the motor acceleration "a" becomes greater than the acceleration determination threshold ath, the idle running flag Xgata_A is set. The approximate straight line LA is updated based on (Ct, DA) during a period from time x10 to time x11 when the idle running flag Xgata_A has been set. When the idle running flag Xgata_A is reset at time x11, the approximate straight line LA is determined.

The timing when the idle running flag Xgata_A is set is delayed from the start of drive of the motor 10, but for simplification, in FIG. 6, it is assumed that the idle running flag Xgata_A is set simultaneously with the start of drive of the motor 10.

When the idle running section ends and the motor shaft 105 and the output shaft 15 rotate integrally, a variation component of the motor acceleration "a" increases, and the rate of change in the length DA of the acceleration variation waveform line increases. When the length DA of the acceleration variation waveform line becomes greater than the determination threshold DAth at time x11, the integral rotation flag Xgata_B is set. From the time x11 when the integral rotation flag XgataB is set to the time x12 when the difference between the encoder count value θen and the drive initial value θinit becomes the drive initial determination value θf, the approximate straight line LB is updated based on (Ct, DA). When the integral rotation flag Xgata_B is reset at time x12, the approximate straight line LB is determined.

The idle running determination unit 52 calculates the backlash ending point XX by using the obtained approximate straight lines LA, LB. In FIG. 6, the backlash ending point XX is time x11. The idle running determination unit 52 sets the encoder count value θen at the backlash ending point XX as the angle correction value θp. The target setting unit 55 calculates the target count value θcmd based on the angle correction value θp and the valley-valley angle design value θdet, and changes the target count value θcmd from the temporary value θt. In practice, there is a calculation delay after the approximate straight line LB is determined at time x12 until the target count value θcmd is changed, but here, for simplification, it is assumed that the target count value θcmd is changed at time x12. Further, the target count value θcmd may be changed at any timing after the time x12 and before the detent roller 26 gets over the peak 210 of the detent plate 21. In FIG. 6, for simplification, the timing at which the idle running flag Xgata_A is reset, the timing at which the integral rotation flag Xgata_B is set, and the backlash ending point XX are all illustrated as being at time x11. These three timings may be different due to a calculation delay, a calculation error, or the like.

The shift range control device 40 of the present embodiment switches a shift range by controlling the drive of the motor 10 in the shift-by-wire system 1 with play existing between the motor shaft 105 that is the rotating shaft of the motor 10 and the output shaft 15 to which the rotation of the motor 10 is transmitted. The shift range control device 40 includes the parameter calculation unit 51, the idle running determination unit 52, the target setting unit 55, and the drive control unit 56.

The parameter calculation unit 51 calculates the encoder count value θen based on the motor rotation angle signal SgE acquired from the encoder 13 that detects the rotational position of the motor 10. The parameter calculation unit 51 calculates an acceleration variation parameter related to the amount of variation in the motor acceleration "a", based on the encoder count value θen. In the present embodiment, the parameter calculation unit 51 corresponds to an "angle calculation unit" and an "acceleration variation calculation unit."

The idle running determination unit 52 determines whether or not the motor 10 is in the idle running state in which the motor 10 is rotating within the range of play, based on the acceleration variation parameter. The target setting unit 55 sets the target count value θcmd using the angle correction value θp that is a value corresponding to the encoder count value θen at the end of the idle running state. The drive control unit 56 controls the drive of the motor 10 so that the encoder count value θen becomes the target count value θcmd.

In the present embodiment, the end of the idle running state is determined based on the acceleration variation parameter related to the amount of variation in the motor acceleration "a," and the target count value θcmd is set based on the encoder count value θen at the end of idle running. The target count value θcmd may be appropriately set without executing learning processing for the amount of play by the abutting control, and highly accurate positioning control may be executed. When the abutting control is executed, the detent mechanism is applied with stress because the detent roller 26 is abutted against the detent plate 21 with a relatively large torque. When the abutting control is to be executed, the detent mechanism or the like need to be designed so as not to be damaged. In the present embodiment, with the abutting control being unnecessary, the shift range switching mechanism 20 may be simplified. Since the output shaft angle as the rotational position of the output shaft 15 is not used for the setting of the target count value θcmd, the output shaft sensor detecting the rotational position of the output shaft 15 may be omitted or the detection accuracy may be moderated.

The acceleration variation parameter of the present embodiment is a value corresponding to the length of the acceleration variation waveform line representing the temporal change of the motor acceleration "a." The integrated value of the motor acceleration change amount ai per unit time is regarded as the length DA of the acceleration variation waveform line. The acceleration variation parameter may be calculated appropriately.

Based on the motor acceleration "a," the idle running determination unit 52 determines the idle running section in which the motor 10 is in the idle running state and the integral rotation section in which the motor shaft 105 and the output shaft 15 are rotating integrally. The idle running determination unit 52 derives the approximate straight line LA representing the temporal change of the length DA of the acceleration variation waveform line in the idle running section and the approximate straight line LB representing the temporal change of the length DA of the acceleration variation waveform line in the integral rotation section. Subsequently, the idle running determination unit 52 determines that the idle running state ends at the backlash ending point XX as the timing at which the approximate straight lines LA, LB intersect. In the present embodiment, the approximate straight lines LA, LB are obtained using the length DA of the acceleration variation waveform line at multiple points in time, the idle running end determination is executed based on the intersection thereof, and the angle correction value θp is calculated. As a result, erroneous determination of the idle running end due to an influence of noise in the encoder 13 is less likely to occur. Therefore, it is possible to improve the accuracy in the determination of the idle running end and the angle correction value θp.

Second Embodiment

Figure 7:
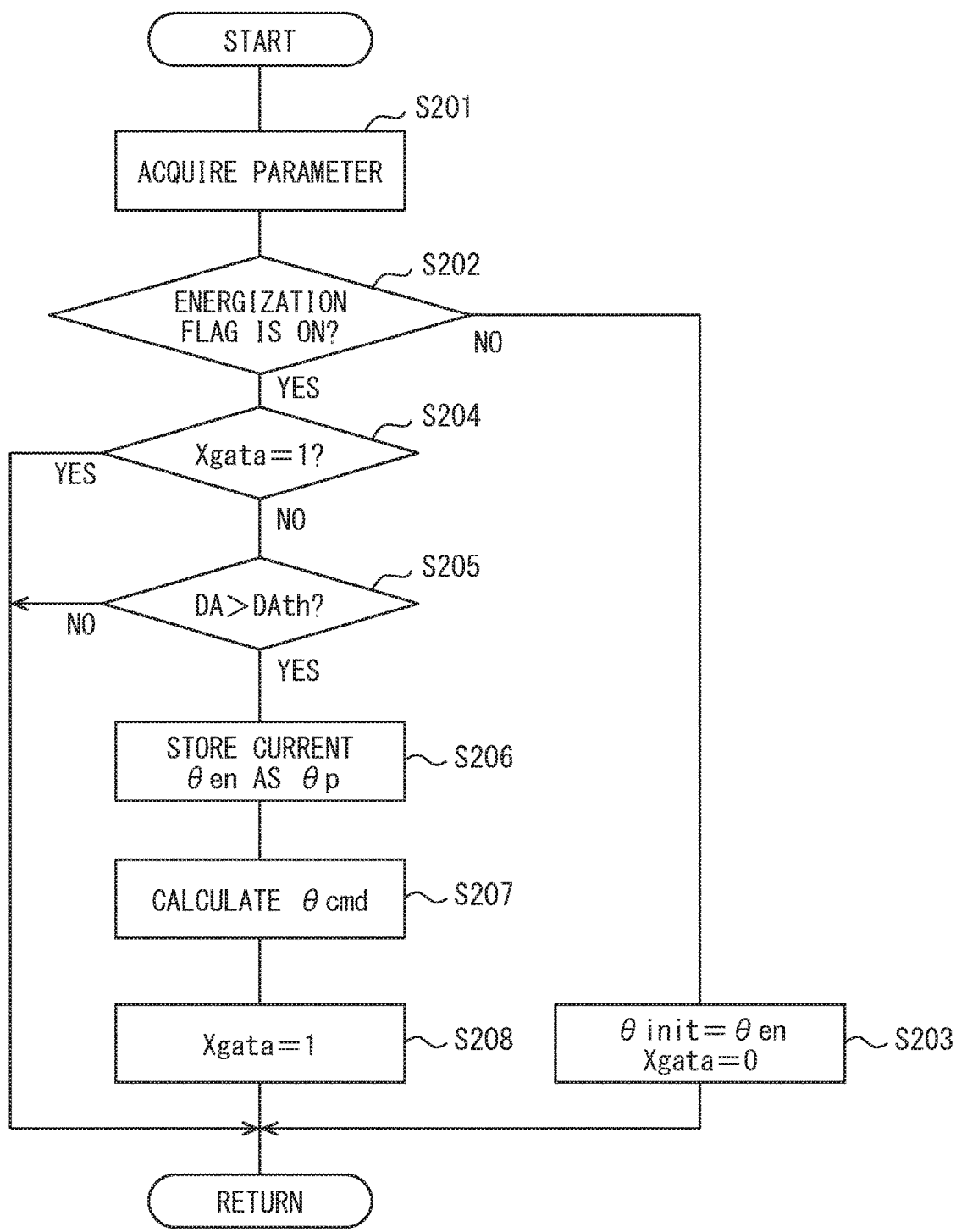
FIG. 7 is a flowchart for illustrating target setting processing according to a second embodiment.

A second embodiment is shown in FIG. 7. In the present embodiment, the target setting processing is different so that this matter is mainly described. The target setting processing of the present embodiment is described based on a flowchart of FIG. 7. In S201, as in S101 in FIG. 4, the idle running determination unit 52 acquires a parameter such as the length DA of the acceleration variation waveform line calculated by the parameter calculation unit 51. In S202, similarly to S102 in FIG. 4, the idle running determination unit 52 determines whether or not the energization flag has been set. When it is determined that the energization flag has not been set (S202: NO), the processing proceeds to S203. When it is determined that the energization flag has been set (S202: YES), the processing proceeds to S204. In S203, the idle running determination unit 52 stores the current encoder count value θen as the drive initial value θinit into the RAM (not shown) or the like. The idle running determination unit 52 resets the learning flag Xgata.

In S204, the idle running determination unit 52 determines whether or not the learning flag Xgata has been set. When it is determined that the learning flag Xgata has been set (S204: YES), the present routine ends. When it is determined that the learning flag Xgata has not been set (S204: NO), the processing proceeds to S205.

In S205, it is determined whether or not the length DA of the acceleration variation waveform line is greater than the determination threshold DAth. When it is determined that the length DA of the acceleration variation waveform line is equal to or less than the determination threshold DAth (S205: NO), it is determined that the backlash idle running is taking place, and the present routine is terminated. When it is determined that the length DA of the acceleration variation waveform line is greater than the determination threshold DAth (S205: YES), it is determined that the idle running state ends, and the processing proceeds to S206.

In S206, the idle running determination unit 52 stores the current encoder count value θen as the angle correction value θp into a storage unit such as the RAM (not shown). In S207, the target setting unit 55 calculates the target count value θcmd based on the angle correction value θp and the valley-valley angle design value θdet (see Expression (7)). In S208, the idle running determination unit 52 sets the learning flag Xgata.

In the present embodiment, when the length DA of the acceleration variation waveform line becomes greater than the determination threshold DAth, the idle running determination unit 52 determines that the idle running state ends. The end of the idle running may be determined by relatively simple processing. In addition, effects similar to those of the above embodiment may also be achieved.

Other Embodiments

In the above embodiment, the integrated value of the amount of change in the motor acceleration per unit time is set as the length of the acceleration variation waveform line. In another embodiment, the length of the acceleration variation waveform line may be calculated by a method other than the integration of the amount of change in the motor acceleration. The acceleration variation parameter may be a value other than the length of the acceleration variation waveform line, such as a value based on an amplitude of the acceleration variation waveform line, so long as being a value related to the amount of variation in the motor acceleration. In view of the correlation between the magnitude of the motor acceleration vibration and the length of the acceleration variation waveform line, various parameters indicating the magnitude of vibration of the motor acceleration may each be considered as "a value in accordance with the length of the acceleration variation waveform line." For example, a value based on the amplitude of the acceleration variation waveform line may also be regarded as included in the concept of "a value in accordance with the length of the acceleration variation waveform line." The end of idle running may be determined in any manner by the acceleration variation parameter.

In the above embodiment, the motor is the DC brushless motor. In another embodiment, the motor may be any motor, such as a switched reluctance motor. In the above embodiment, the number of winding sets of the motor is not mentioned, but one winding set or multiple winding sets may be used. In the above embodiment, the motor rotation angle sensor is the encoder. In another embodiment, the motor rotation angle sensor is not limited to the encoder, but any other device such as a resolver may be used. That is, the motor angle is not limited to the encoder count value but may be any value that may be converted into a motor angle.

In the above embodiment, the output shaft sensor may be omitted. In another embodiment, an output shaft sensor that detects the rotational position of the output shaft may be provided. For example, when the output shaft sensor is operating normally, the end of the idle running state may be determined using the detected values of the motor rotation angle sensor and the output shaft sensor, and when the output shaft sensor cannot be used due to having a fault or the like, the end of the idle running state may be determined based on the acceleration moving average value as in the above embodiment.

In the above embodiment, the detent plate is provided with two recesses. In another embodiment, the number of recesses is not limited to two but may be any number. For example, four recesses may be provided corresponding to the respective ranges of P (parking), R (reverse), N (neutral), D (drive). The shift range switching mechanism, the parking lock mechanism, or the like may be different from those in the above embodiment.

In the above embodiment, the speed reducer is provided between the motor shaft and the output shaft. Although the details of the speed reducer are not mentioned in the above embodiment, the speed reducer may have any configuration, such as one using a cycloid gear, a planetary gear, or a spur gear that transmits a torque from a speed reduction mechanism substantially coaxial with the motor shaft to the drive shaft, and one using these gears in combination. In another embodiment, the speed reducer between the motor shaft and the output shaft may be omitted, or a mechanism other than the speed reducer may be provided. That is, in the above embodiment, the description has been made mainly on the case where "play" between the motor shaft and the output shaft exists between the gear of the speed reducer and the motor shaft. However, the "play" may be considered as the total of play, backlash, or the like existing between the motor shaft and the output shaft. As mentioned above, the present disclosure is not limited to the above embodiments but may be implemented in various forms in the scope not deviating from its gist.

Although the present disclosure has been made in accordance with the embodiments, it is understood that the present disclosure is not limited to such embodiments and structures. The present disclosure encompasses various modifications and variations within the scope of equivalents. While the various elements are shown in various combinations and configurations, which are exemplary, other combinations and configurations, including more, less or only a single element, are also within the spirit and scope of the present disclosure.

What is claimed is:

1. A shift range control device for switching a shift range by controlling drive of a motor in a shift range switching system with play existing between a motor shaft being a rotating shaft of the motor and an output shaft to which rotation of the motor is transmitted, the shift range control device comprising:
   an angle calculation unit that is configured to calculate a motor angle based on a motor rotation angle signal acquired from a motor rotation angle sensor detecting a rotational position of the motor;
   an acceleration variation calculation unit that is configured to calculate an acceleration variation parameter related to an amount of variation in a motor acceleration, based on the motor angle;
   an idle running determination unit that is configured to determine an end of an idle running state in which the motor is rotating within a range of the play, based on the acceleration variation parameter;
   a target setting unit that is configured to set a target motor angle value by adopting an angle correction value being a value corresponding to the motor angle at the end of the idle running state; and
   a drive control unit that is configured to control the drive of the motor such that the motor angle becomes the target motor angle value.

2. The shift range control device according to claim 1, wherein the acceleration variation parameter is a value corresponding to a length of an acceleration variation waveform line indicating a temporal change in the motor acceleration.

3. The shift range control device according to claim 2, wherein the acceleration variation calculation unit sets an integrated value of an amount of change in the motor acceleration per unit time as the length of the acceleration variation waveform line.

4. The shift range control device according to claim 2, wherein the idle running determination unit is configured to:
   determine an idle running section in which the motor is in the idle running state based on the motor acceleration, and
   determine an integral rotation section in which the motor shaft and the output shaft are rotating integrally based on the motor acceleration;
   derive a first approximate line as an approximate line representing a temporal change in the length of the acceleration variation waveform line in the idle running section;
   derive a second approximate line as an approximate line representing a temporal change in the length of the acceleration variation waveform line in the integral rotation section; and
   determine that the idle running state ends at an intersection between the first approximate line and the second approximate line.

5. The shift range control device according to claim 2, wherein the idle running determination unit determines that the idle running state ends, in response to that the length of the acceleration variation waveform line becomes greater than a determination threshold.

6. A shift range control device for switching a shift range by controlling drive of a motor in a shift range switching system with play existing between a motor shaft being a rotating shaft of the motor and an output shaft to which rotation of the motor is transmitted, the shift range control device comprising:
   a microcomputer configured to:
      calculate a motor angle based on a motor rotation angle signal acquired from a motor rotation angle sensor detecting a rotational position of the motor;
      calculate an acceleration variation parameter related to an amount of variation in a motor acceleration, based on the motor angle;
      determine an end of an idle running state in which the motor is rotating within a range of the play, based on the acceleration variation parameter;
      set a target motor angle value by adopting an angle correction value being a value corresponding to the motor angle at the end of the idle running state; and
      control the drive of the motor such that the motor angle becomes the target motor angle value.

* * * * *